United States Patent
Pond et al.

(10) Patent No.: US 11,537,771 B2
(45) Date of Patent: Dec. 27, 2022

(54) SYSTEM AND METHOD FOR SIMULATING AND ANALYZING QUANTUM CIRCUITS

(71) Applicant: Ansys Lumerical IP, Inc., Wilmington, DE (US)

(72) Inventors: James Frederick Pond, Vancouver (CA); Jeffrey Francis Young, North Vancouver (CA); Ellen Natalie Schelew, Vancouver (CA); Xiruo Yan, Vancouver (CA)

(73) Assignee: ANSYS Inc., Canonsburg, PA (US)

( * ) Notice: Subject to any disclaimer, the term of this patent is extended or adjusted under 35 U.S.C. 154(b) by 235 days.

(21) Appl. No.: 16/913,292

(22) Filed: Jun. 26, 2020

(65) Prior Publication Data

US 2020/0327269 A1    Oct. 15, 2020

Related U.S. Application Data

(63) Continuation of application No. PCT/CA2019/051236, filed on Sep. 4, 2019.
(Continued)

(51) Int. Cl.
*G06F 30/3308*    (2020.01)
*G06F 30/337*    (2020.01)
(Continued)

(52) U.S. Cl.
CPC .......... *G06F 30/3308* (2020.01); *G06F 30/25* (2020.01); *G06F 30/337* (2020.01);
(Continued)

(58) Field of Classification Search
USPC .......................................................... 703/14
See application file for complete search history.

(56) References Cited

U.S. PATENT DOCUMENTS

| 9,354,039 B2 | 5/2016 | Mower et al. |
| 2015/0354938 A1 | 12/2015 | Mower et al. |

(Continued)

FOREIGN PATENT DOCUMENTS

| JP | 2018096903 A | 6/2018 |
| WO | 2004015545 A2 | 2/2004 |

OTHER PUBLICATIONS

Deepak Sridharan and Edo Waks Department of Electrical and Computer Engineering, IREAP and JQI,University of Maryland: "Generating entanglement between quantum dots with different resonant frequencies based on Dipole Induce Transparency", dated Oct. 9, 2008, 25 pages, arXiv:quant-ph/0703089v2.

(Continued)

*Primary Examiner* — Bryce M Aisaka
(74) *Attorney, Agent, or Firm* — Wen-Jeng Vincent Lue

(57) ABSTRACT

A system and method are provided to enable non-quantum experts to schematically represent, simulate and quantify the performance of physically realistic photonic quantum circuits. The framework offers the flexibility for users—not necessarily familiar with the fundamentals of quantum mechanics—to create circuits and work with simple inputs and outputs, while the complexities of manipulating high dimensionality quantum Hilbert spaces supporting photonic and physical quantum object states are handled with the use of purpose-built tools. The tools include a user-friendly method for defining classical photonic circuits which may be coupled to physical objects such as qubits, quantum input states, as well as classical and quantum measurement devices. The tools feature classical-to-quantum S-matrix conversion, quantum S-matrix extraction, as well as capabilities for defining and extracting quantum error parameters. The framework also supports extraction of post- (Continued)

measurement quantum states for use in subsequent circuits or simulators.

20 Claims, 14 Drawing Sheets

Related U.S. Application Data

(60) Provisional application No. 62/726,720, filed on Sep. 4, 2018.

(51) Int. Cl.
  *G06N 10/00* (2022.01)
  *G06F 30/25* (2020.01)
  *H04B 10/70* (2013.01)
  *G06F 111/12* (2020.01)

(52) U.S. Cl.
  CPC ............. *G06N 10/00* (2019.01); *H04B 10/70* (2013.01); *G06F 2101/14* (2013.01); *G06F 2111/12* (2020.01)

(56) References Cited

U.S. PATENT DOCUMENTS

2018/0157986 A1    6/2018   Oxford et al.
2021/0192114 A1*   6/2021   Boixo Castrillo .. G06F 30/3308

OTHER PUBLICATIONS

E. Knill et al.: "A scheme for efficient quantum computation with linear optics", Los Alamos National Laboratory and Centre for Quantum Computer Technology, University of Queensland, dated Jan. 4, 2001, 7 pages, vol. 49, 2001 Macmillian Magazines Ltd, www.nature.com.

G. Karoru Sanaka et al.: "Experimental nonlinear sign shift for linear optics quantum computation", Institut fur Experimentalphysik, Universitat Wien, dated May 15, 2018, 4 pages, arXiv:quant-ph/0308134v2, Austrian Science Foundation (FWF), project Nos. M666 and SFB015 P06, NSERC, and the European Commission, contract No. IST-2001-38864.

Search report issued in corresponding PCT Application No. PCT/CA2019/051236, dated Sep. 4, 2019, 2 pages.

International Preliminary Report issued in corresponding PCT application No. PCT/CA2019/051236, dated Mar. 9, 2021, total 5 pages.

* cited by examiner

SYSTEM AND METHOD FOR SIMULATING AND ANALYZING QUANTUM CIRCUITS

CROSS-REFERENCE TO RELATED APPLICATION(S)

This application is a continuation of PCT Application No. PCT/CA2019/051236, which claims priority to U.S. Provisional Patent Application No. 62/726,720 filed on Sep. 4, 2018, the contents of which are incorporated herein by reference.

TECHNICAL FIELD

The following relates to systems and methods for analyzing quantum circuits, for example in analyzing such quantum circuits designed to perform a certain quantum function within a larger quantum system.

BACKGROUND

There is a great deal of recent interest, investment, and developments occurring in the field of quantum systems for a variety of applications including, for example, quantum computing, quantum communications, quantum sensing and quantum imaging. Hardware implementations of many quantum applications can be realized using photonic circuits, both integrated and bulk component-based, to prepare, transmit, and process information encoded in the quantum state of the photons themselves, sometimes also allowing for the photons to interact with other material-based quantum information processing elements, such as electronic spin states. This is motivated by the theoretically valid prediction that certain information processing functions that rely fundamentally on quantum mechanics can out-perform the best conceivable classical implementations.

The relevant photonic systems comprise a collection of interconnected classical components, some of which may contain material-based quantum elements. For a given quantum application, an expert quantum engineer can design the system at a block-diagram level, typically so that it performs the desired quantum function "perfectly", assuming ideal component performance, much like the initial design step in the classical photonic circuit design process. In practice, the performance of the overall circuit, for either quantum or classical applications, is not ideal when realistic component performance is taken into account. It is now routine in the classical photonic circuit domain for engineers to optimize actual circuit performance by simulating the circuit behavior and analyzing it at arbitrary internal nodes using a variety of tools, such as virtual optical oscilloscopes and optical network analyzers. For example, engineers can use these tools to identify and fix weak links, take account of manufacturing tolerances to predict overall circuit yield, etc.

Existing classical photonic circuit simulation and analysis tools are known to use the classical Maxwell equations to track a set of complex electric field amplitudes in a discrete set of circuit channels as a function of time or frequency. Here, the term "channel" may be used to refer to each independent optical input (or output). Since optical waveguides support multiple modes, the total number of input channels is equal to the total number of optical modes supported in all the optical waveguides that provide inputs to the circuit. At any given time or frequency, a complete set of electric field amplitudes, of number N, completely describes the input optical field distribution into the circuit in each of the N input channels. A simulation typically involves calculating the set of electric field amplitudes in each of the output channels (typically, but not always, also of number N) for some specified set of electric field amplitudes in each of the input channels, with the option of also calculating the set of electric field amplitudes in a (generally different) set of channels at any given internal node of the circuit. On a node by node basis, these classical optical circuit simulator/analyzers are therefore generally more complex than their electrical circuit counterparts, which only deal with two parameters—the voltage and net current. The successful development of optical circuit simulation/analysis tools required qualitatively new concepts, models, and software implementations as compared to the well-evolved electrical circuit modelling domain. These optical circuit simulation/analysis tools are often used in combination (through co-simulation or waveform exchange) with electrical circuit tools when systems include electrical, optical and opto-electronic components.

A further complexity of photonic circuits is that waveguides support bidirectional (as well as multi-mode) propagation of light. In some circuits, some or all of the output optical field distribution is actually carried on the same physical waveguides as the input signal but traveling away from the circuit. In terms of schematic representation of a circuit, it is possible to use bidirectional ports or, alternatively, unidirectional ports to represent separately the incoming signals and outgoing signals regardless of whether they exist physically on the same waveguide. Similarly, the multi-mode behavior can be represented as a single port carrying multiple modes, or as multiple ports. Here, ports are represented as unidirectional (either input or output only) but where each port can carry multiple optical modes, however, it is understood that other schematic representations could be chosen.

The generalization to quantum optical circuit simulation and analysis involves another qualitative leap, considered by some to be even larger than that required to go from the electrical to optical circuit domains. The Maxwell equations need to be augmented with Schrödinger's equation to solve the dynamical equations of motion for light propagating through the circuit, possibly interacting with material objects that also need to obey Schrödinger's equation of motion.

Inherent to the potential power of quantum information processing is the fact that the number of parameters required to fully characterize even pure multi-particle quantum states (kets) is a non-linear, increasing function of the number of quantum objects (particles) involved in the process. Instead of keeping track of a single complex field amplitude for each orthogonal mode at a given location in the circuit, one is faced with dealing with the complex amplitudes of all possible permutations of states corresponding to a given number of photons distributed amongst those orthogonal modes. The number of defining parameters, D, is typically much larger than N, and increases nearly exponentially with the number of photons. The set of all possible waveguides and modes, on which a given set of photonic quantum states exist, along with a defined maximal number of photons, n, can be referred to as a "photonic quantum bus", that is a photonic Hilbert space that cannot be treated as a set of independent waveguides and modes. When the photons can interact with physical quantum objects, or physical qubits (e.g., electron spin states), the number of defining parameters (i.e., the dimensionality of the total Hilbert space), M, becomes D multiplied by the dimension of the physical qubit space, Q, which is some power of the number of physical quantum objects. The physical quantum objects can be typically considered as few-state systems with typical implementations using two-levels (qubits) or three-levels (qutrits) systems. For simplicity, the following may refer only to qubits but it is understood that the principles discussed herein may be applied to any multi-level system.

Beyond this dramatic increase in the number of parameters needed to keep track of a pure quantum mechanical state (ket), in comparison to its classical counterpart, there is yet another level of complexity that needs to be taken into account. This has to do with the fact that in almost all realistic quantum circuits, photons can be scattered out of the circuit, and such losses typically transform pure quantum states (kets) into a mixed state that is to be described by a density matrix that has a number of elements equal to the square of the dimensionality of the basis needed to specify a simple pure state (ket). More generally, the input state to a quantum circuit may not, for a number of reasons, be expressible as a pure quantum state (ket) and can only be defined in terms of a density matrix. Thus, a numerical simulation algorithm operating on a Hilbert space with dimensionality M, in general should be able to transform an input density matrix of dimension $M^2$, to an output density matrix of the same dimension.

This level of complexity explains the current state of quantum optical circuit analysis which relies largely on custom calculations performed by specialists in the field. These are typically tedious calculations that are part analytical and part numerical, and largely unique to each system or circuit, e.g., as discussed in "*Generating entanglement between quantum dots with different resonant frequencies based on dipole-induced transparency*", Sridharan, D., and Waks, E., Phys Rev A 78 052321 (2008). This can severely limit the rate at which realistic calculations can be performed on competing circuit designs, which in turn makes it difficult to accurately account for the effects of realistic manufacturing imperfections on circuit performance.

In addition, these calculations typically assume that each photon can be represented as a continuous wave function at a single frequency, rather than a wave packet with finite duration. In this approximation, it is difficult to study the impact of high repetition rates—where photons or photonic states arrive at the circuit in rapid succession—as well as the interaction of photons with highly resonant circuits which can significantly modify the shape of the photon wave packet.

Again, for reasons of complexity, many current calculations do not realistically portray the input quantum state, or density matrix, nor do they fully account for the impact of imperfect measurements of the output state on the quantum functionality of the circuit. The latter highlights yet another qualitative and fundamental distinction between quantum and classical circuit or state analysis. That is, in quantum mechanical systems the act of measurement fundamentally alters the overall system state, while classically the act of measurement is typically perturbative at most, and often has no impact on the circuit performance. It is therefore desirable to develop an accurate but algorithmic way to simulate realistic quantum optical circuits, and to accurately assess the impact of realistic measurements on the density matrix. Furthermore, it is important to account not only for manufacturing errors in the circuit but also for errors in the measurement, for example by including the possibility of dark current in single photon detectors which can result in false counts.

Finally, there are few tools currently available to quantify or visualize the performance of photonic systems in standardized ways such that the relative performance of various circuits can be compared. For example, two circuits which ideally achieve the same result may have very different performance (or yield) when manufacturing imperfections are accounted for.

Currently, several quantum computing simulators have been developed, which allow users to define a sequence of quantum gates and simulate how quantum processing algorithms would be run using these gates, for example, the system described in U.S. Pat. No. 5,787,236 to Tucci.

In these products, the properties of the actual gates are parameterized, but they do not provide corresponding tools to generate a set of realistic parameters for a specific physical implementation of that gate.

It is an object of the following to address the above-described deficiencies in current quantum optical circuit simulation and analysis systems.

BRIEF DESCRIPTION OF THE DRAWINGS

Embodiments will now be described with reference to the appended drawings wherein.

DETAILED DESCRIPTION

Figure 1:
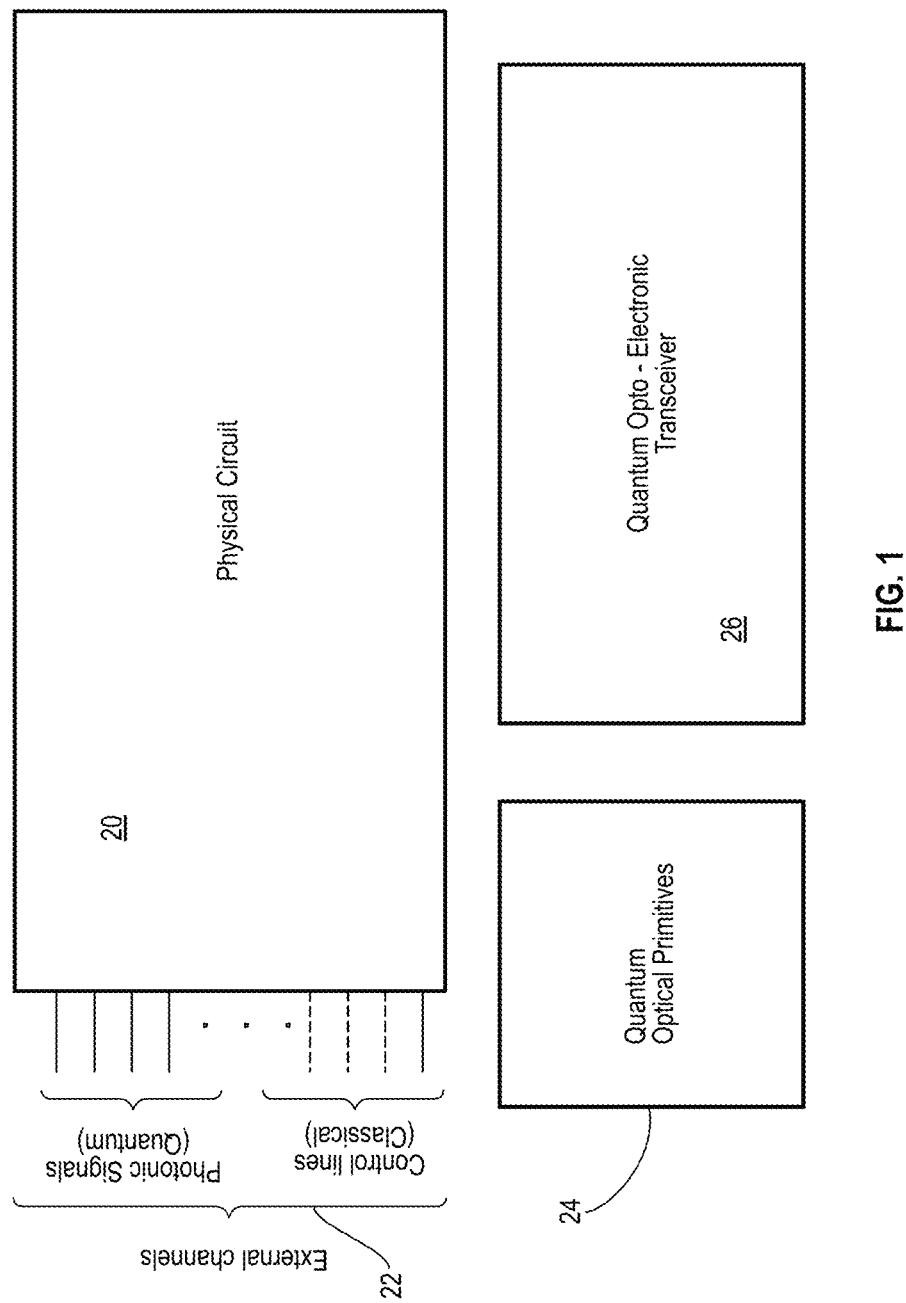
FIG. 1 is a schematic diagram of a set of primary quantum components.

The following may address the above-described deficiencies, by starting with physical circuit layouts, and offering modelling tools to extract performance parameters relevant to higher-level quantum computing simulators.

There is provided a method of graphically defining a physically-realizable system comprising an optical circuit, wherein photons may or may not interact with physical qubits that may or may not be embedded within interconnected optical components, and that may contain detection devices.

There is also provided a method to transparently extract and specify the computational Hilbert space(s) relevant to a quantum simulation directly from a physical layout of the circuit. These Hilbert spaces are generally defined by the number of classical optical channels (waveguides and modes), a maximal photon number and the number and type of physical qubits embedded within the system. Various ordered basis states can be used to represent these Hilbert spaces, and sometimes it is useful to define the transformations between different representations of the same space. In most embodiments, the user will specify an input pure state (ket) or density matrix (that may or may not be entangled), using a graphical or scripting interface, and the result of the calculation produces an output density matrix.

The user can further specify a set of measurement devices (e.g., photon detectors at the terminus of certain physical channels) in the circuit, and there is a tool to calculate the relative quantum mechanically-allowed probabilities for all possible measurement outcomes, along with the corresponding projected density matrix (typically entangled, and typically, but not necessarily of lower dimension than the pre-measurement density matrix). The code transparently deals with internal specifications of Hilbert spaces (photonic quantum buses) at play in different parts of the overall circuit. The user can further specify imperfections in the measurement devices (such as dark current) that can be used in subsequent error analysis of results.

There is also provided a method for calculating quantum mechanical unitary transformation properties of realistic physical circuits on an input density matrix defined on a Hilbert space, based on classical performance parameters of the physical circuit such as the classical S-matrix.

There is also provided a method to define a circuit element that can be used to combine distinct, independent Hilbert spaces into a single Hilbert space of larger dimensionality.

The following also describes a method to quantitatively compare the actual output state (or quantum transformation matrix) of a physically realistic circuit with the ideal output state (or quantum transformation matrix) of the circuit in order to characterize the difference (the error). The user has the flexibility to specify what error metric(s) to use in this characterization.

In one aspect, there is provided a method of simulating a physically realistic quantum circuit, the method comprising: receiving a classical photonic circuit schematic, a maximum photon number, and a photonic input state for the quantum circuit; calculating a quantum S-matrix of the quantum circuit based on the classical photonic circuit schematic and the maximum photon number; and generating a quantum output state of the quantum circuit based on the photonic input state and the quantum S-matrix.

In another aspect, there is provided a computer readable media storing instructions for performing the above method.

In yet another aspect, there is provided a system for simulating and quantifying performance of a physically realistic quantum circuit, the system comprising a processor, memory and a user interface, the memory storing computer executable instructions that, when executed by the processor, cause the system to perform the method. A simulation software program comprising the system is also provided.

In the following, a system and method are provided which implement new quantum sources, quantum detectors, quantum "oscilloscopes" and quantum network analyzers within an optical analysis and simulation framework. These new quantum components and analysis tools are configured to enable users who are not necessarily familiar with the fundamentals of quantum mechanics, to engineer (e.g., build, analyze, and optimize the performance of) quantum optical circuits at the component level. The system can complement or be incorporated as a co- or pre-simulation package, for a variety of quantum computing (QC) simulator tools.

In an implementation, the system described herein can be used prior to running existing QC simulator routines, to provide realistic parameters for the individual gates/components within the quantum circuit being simulated. In some circumstances, the system can be incorporated as a co-simulation package or backend in such QC simulators.

Turning now to the figures, FIG. 1 provides a schematic view of a set of primary components used by the system described herein in creating quantum simulations, namely a set of physical circuits 20 each having one or more but typically a plurality of external inputs and outputs 22, composed of optical channels and classical control lines, a set of quantum optical primitives 24, and a quantum optoelectronic transceiver 26. The physical gate circuit 20 includes a set of individual optical elements (i.e. beamsplitters, resonators, directional couplers, etc, with associated S matrices), excluding detectors and sources. The physical gate circuit 20 also includes the associated connecting paths/channels. Each individual optical element can have its S matrix controlled by a set of physical qubits (of number G), with an associated Hilbert space of dimension Q. For example, if all qubits have two degrees of freedom, $Q=2^G$. Many of the channels may be strictly internal to the circuit, however, some extend externally, generally bi-directionally. In some cases, the external connection can be simplified to be unidirectional to save memory. Some of the unidirectional output channels may be associated with lossy elements. The system can be embodied in various ways, for example on a single computing workstation or distributed among multiple computing devices. It may be noted that the system described herein can be deployed on a classical computer available currently in a manner similar to how classical photonic circuits are simulated currently.

The quantum optical primitives 24 include, for instance, single/entangled photon sources, single and N-photon detectors, beam-dumps, etc. The quantum opto-electronic transceiver 26 contains discrete photon detectors, beam-dumps and associated logic, along with both quantum optical and classical pulsed microwave sources. For example, the transceiver 26 may herald the forwarding of a successfully processed quantum state from a previous circuit, based on a specified measurement made by detectors, then initialize the physical qubits in the next circuit, and inject appropriate ancilla photon states.

Figure 2:
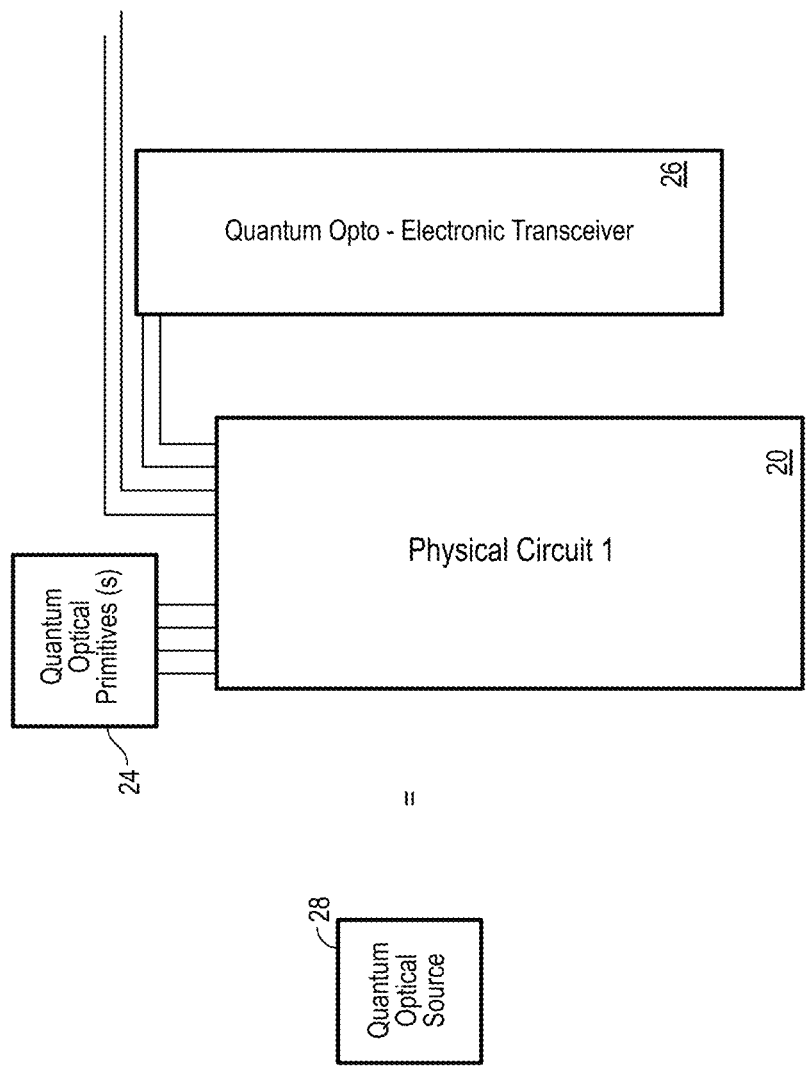
FIG. 2 is a schematic diagram of a simple quantum sub-circuit, in this case a quantum optical source.

FIG. 2 illustrates an example of a quantum optical subcircuit, which in this case is a quantum optical source 28, and which in this example includes a physical gate circuit 20 (i.e. Physical Gate Circuit 1), that is fed by one or more quantum optical primitives 24, and the quantum opto-electronic transceiver 26. The quantum opto-electronic transceiver 26 in this arrangement is monitoring some of the output channels of the physical circuit 20 to make a quantum measurement, the result of which can be used to determine if the output photonic state in the remaining channels of the physical circuit 20 is the desired quantum state. The quantum optical primitives can be single photon sources or classical laser sources that would interact nonlinearly within the physical circuit 20 to generate entangled photon pairs, for instance.

The sub-circuit of FIG. 2 can be cascaded, or combined with other similar sub-circuits, to create much more complex quantum circuits.

Figure 3:
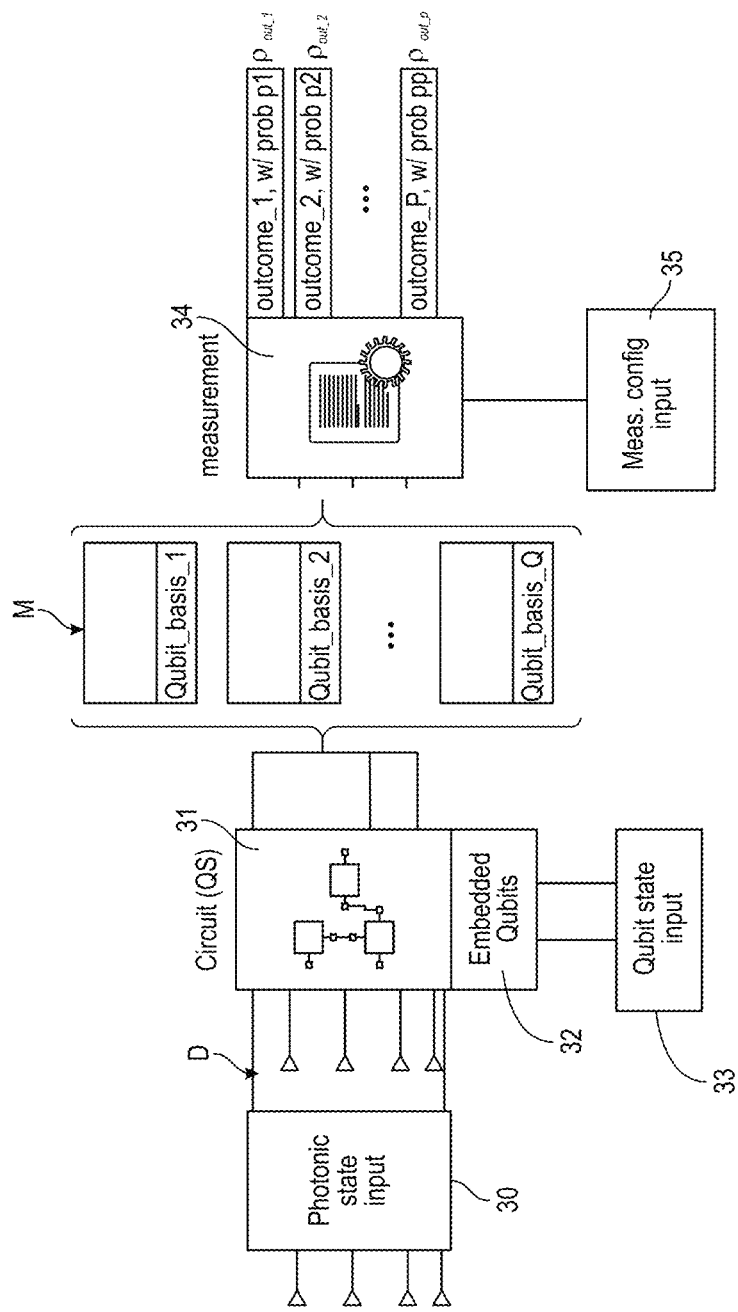
FIG. 3 is a schematic diagram of a quantum circuit with embedded qubits.

FIG. 3 shows a detailed schematic of a quantum circuit 31 with embedded qubits 32, a qubit state input 33, a photonic input state 30 (on a photonic quantum bus) and a measurement stage 34 resulting in all possible measurement outcomes, their probabilities and resulting projected output quantum states. The measurement stage outputs can be further configured with the measurement configuration input 35 to, for example, output only states corresponding to a particular measurement outcome. Since the photons can interact with the physical qubits, the number of defining parameters of the internal Hilbert space, M, is the product of the number of photonic states, D, and number of qubit states, Q, shown schematically in the center of the diagram. Initially, the measurement outcomes are calculated assuming that the measurement devices function ideally, however, post analysis can be easily used to introduce non-ideal effects such as dark current, even in the measurement devices. The measurement results can be analyzed in a variety of ways. For example, they can be used to extract quantitative measures of errors which can be used to quantify the performance of a circuit 31, which can furthermore be used in larger quantum system simulators. Additionally, they can be used, through Monte Carlo style statistical methods, to generate a sequence of random quantum output states that mimic a series of measurements on a sequence of input states. Similarly, they could be used to simulate a cascaded series of such quantum circuits, again using statistical methods.

Figure 4:
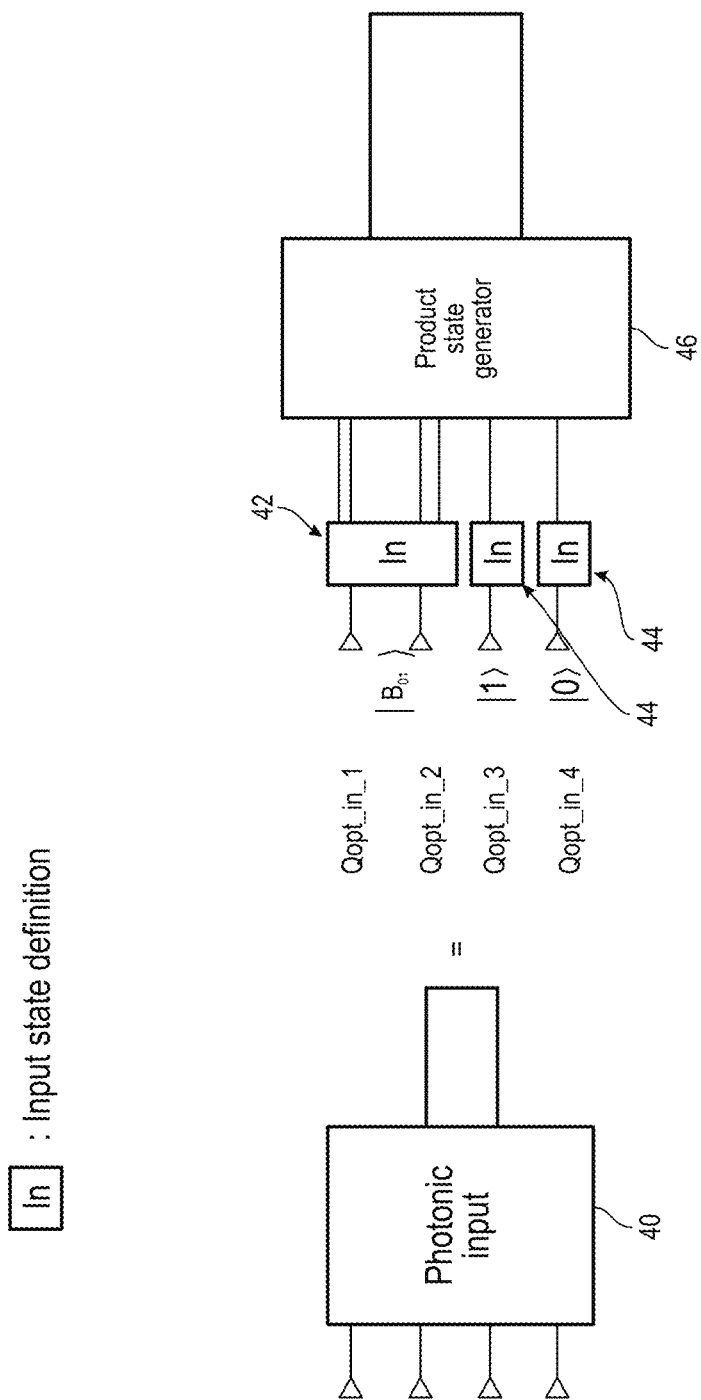
FIG. 4 is a schematic showing how a product state generator can be used to combine uncorrelated states on photonic quantum buses (Hilbert spaces) into product states on a larger photonic quantum bus (Hilbert space) that can support arbitrary photonic quantum states.

FIG. 4 shows an example of a product state generator 46 being used to combine uncorrelated states on photonic quantum buses (Hilbert spaces) of a photonic input 40, into product states on a larger photonic quantum bus (Hilbert space) that can support arbitrary quantum optical states (constrained by the maximum number of photons parameter). This is often necessary when circuits require ancilla inputs 44. Typically, the initial ancilla input states 44 are known to be uncorrelated with the signal input states and therefore the complete state is simply the direct product of the signal input 40 and ancilla input states 44. Afterwards, this product state could be the input state to a circuit that will in general produce an output state that is entangled by embedded quantum elements and measurements (e.g., signal photons can be an entangled state as shown at numeral 42 in FIG. 4). This is a convenience which allows the user to define smaller Hilbert spaces and states more easily when they are known initially to be minimally entangled.

Figure 5A:
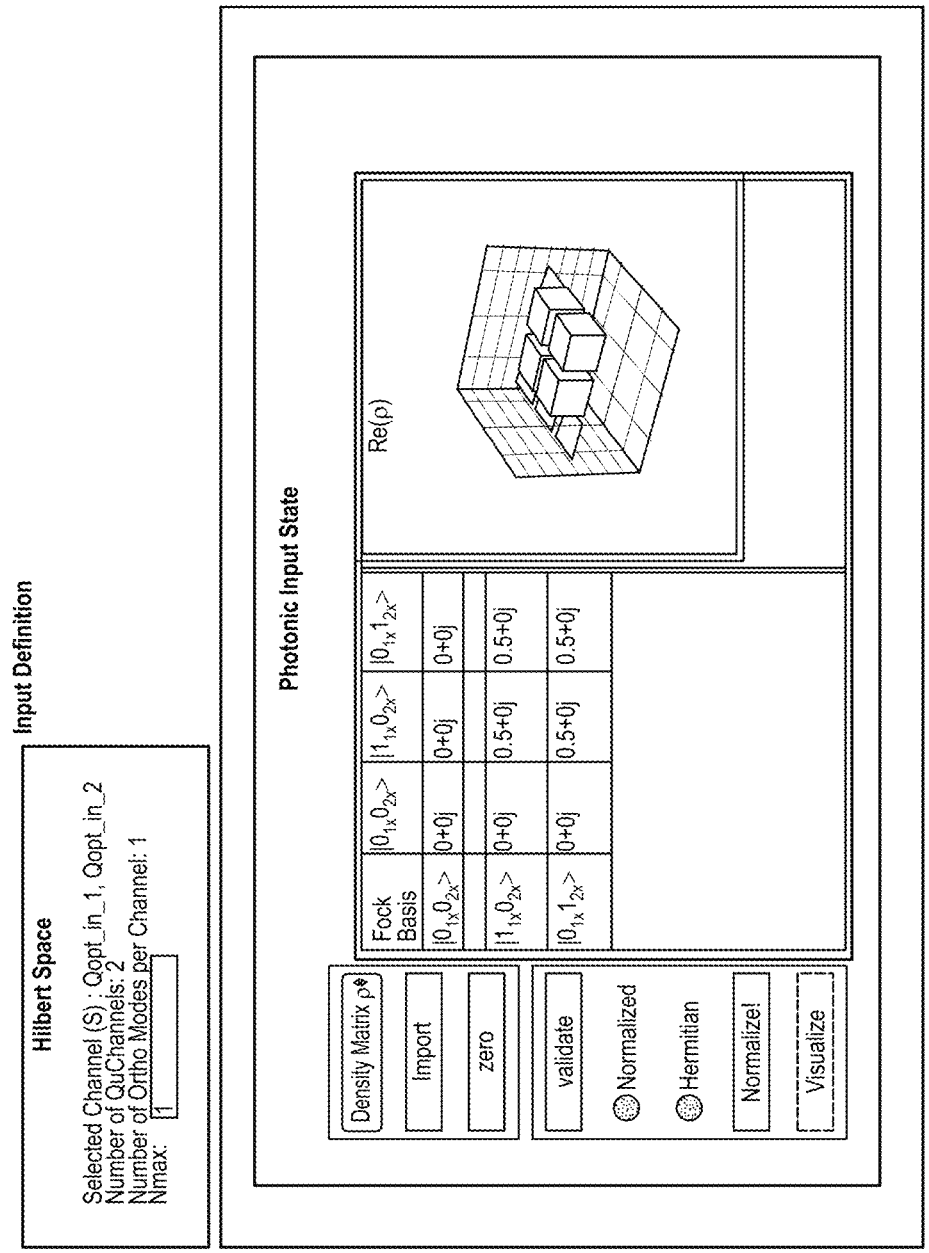
FIGS. 5A and 5B are examples of a user interface that can be used to define Hilbert spaces (including photonic and/or physical qubits) as well as states in this space (either pure (ket) or density-matrix based).
Figure 5B:
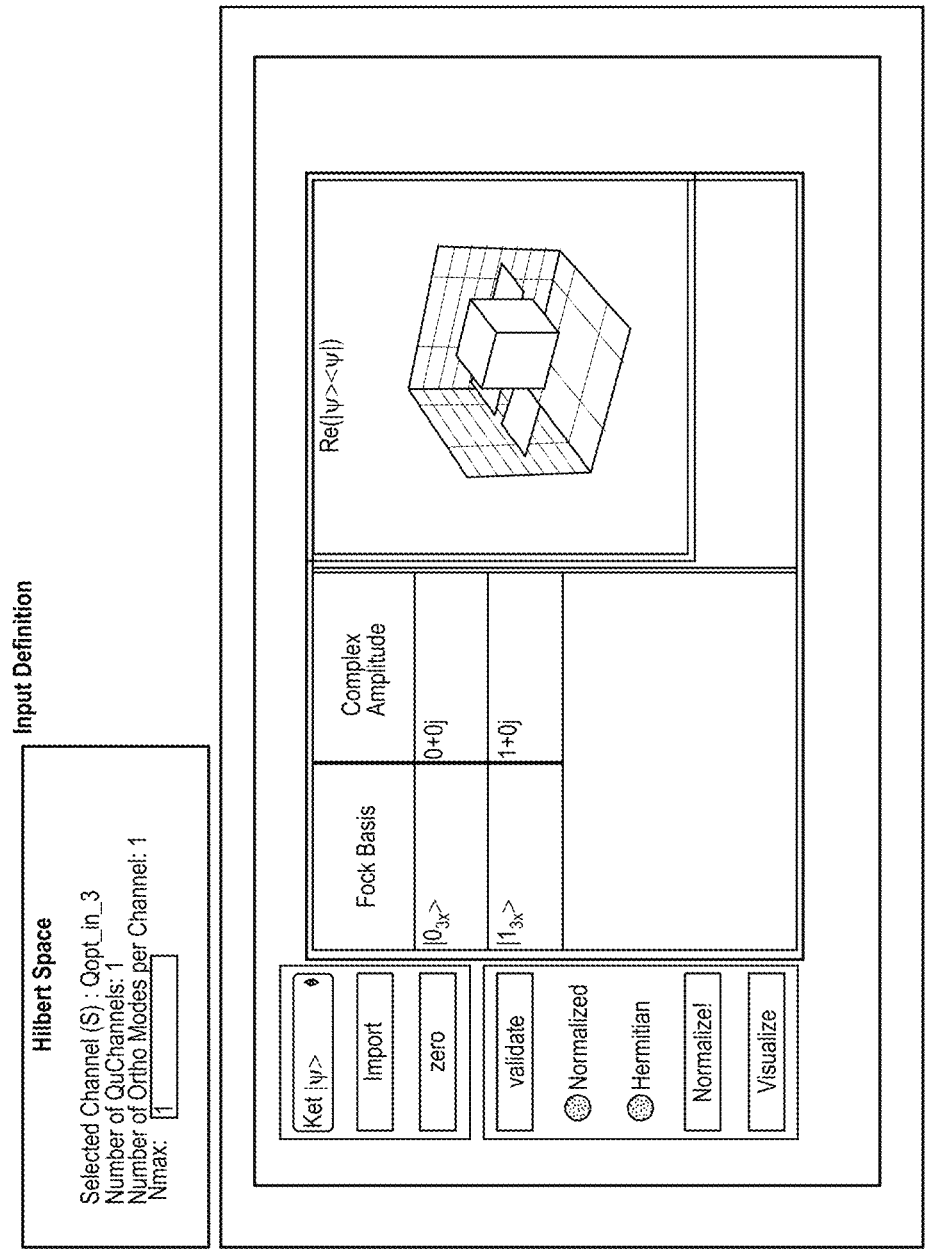

In FIGS. 5A and 5B, one can observe an example user interface that can be used to define Hilbert spaces (including photonic and/or physical qubits) as well as states in this space (either pure or density-matrix based). The example in FIG. 5A shows a density matrix of a Bell state for a 2-channel photonic input, namely for input channels Qopt_in_1 and Qopt_in_2 The example in FIG. 5B shows a pure one photon state that can be used for a common ancilla input 44, namely for input channel Qopt_in_3. This type of user interface can make it relatively simple for a user to create and visualize numerical representations of Hilbert spaces and their states (either pure or density-matrix based) which are directly linked to the physical circuit configurations pre-defined by the user.

Figure 6:
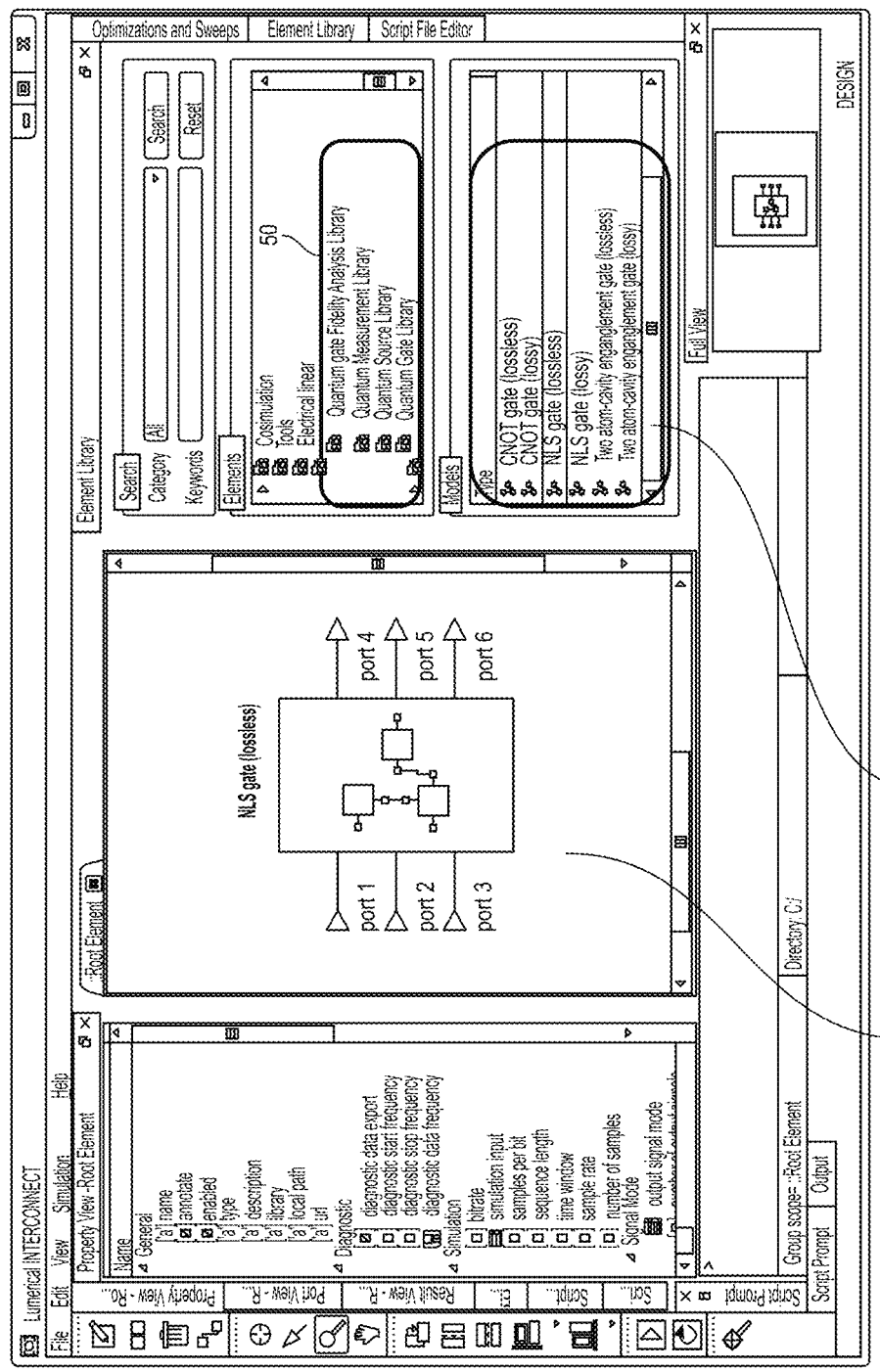
FIG. 6 is a screen shot of a user interface for creating a quantum circuit for analysis and simulation.

Turning now to FIG. 6, a screen shot of an example user interface is shown, which is used in creating and analyzing a quantum circuit using the system described herein. This example illustrates how the system can be used to analyze an NLS gate (see, for example: Knill E, Laflamme R, Milburn G J., "A scheme for efficient quantum computation with linear optics," Nature, 2001 January, 409(6816):46, or "Quantum Computing Devices: Principles, Designs, and Analysis", Goong Chen David A. Church Berthold-Georg Englert Carsten Henkel Bernd Rohwedder Marlan O. Scully M. Suhail Zubairy, Sep. 18, 2006 CRC Press). For example, consider a scenario in which an end-user has designed an NLS gate using integrated photonics by combining directional couplers with phase shifters. The end-designer wants to understand how the fidelity and likelihood of a given measurement outcome is affected by errors in the phase shifters, or imperfect directional couplers. Finally, the end-designer wants to save the set of possible output states of the NLS gate for use in subsequent simulations. In FIG. 6, the user interface provides a series of new quantum elements that have been created within a simulation framework. In the screenshot, one can see an NLS gate element in a schematic form. Also shown are other gate elements available in a Quantum Gate Library 52. These are CNOT gates, two-atom cavity entanglement gates in addition to the NLS gate. Each gate has a lossy and a lossless version. Also shown in the screen shot in FIG. 6 are other quantum libraries of elements 50 that can be provided, namely: Quantum Gate Error Analysis, Quantum Measurement and Quantum Source libraries 50. In this example, the NLS gate (lossless) element is selected from the library 52 and shown in the schematic form in window 54.

Figure 7:
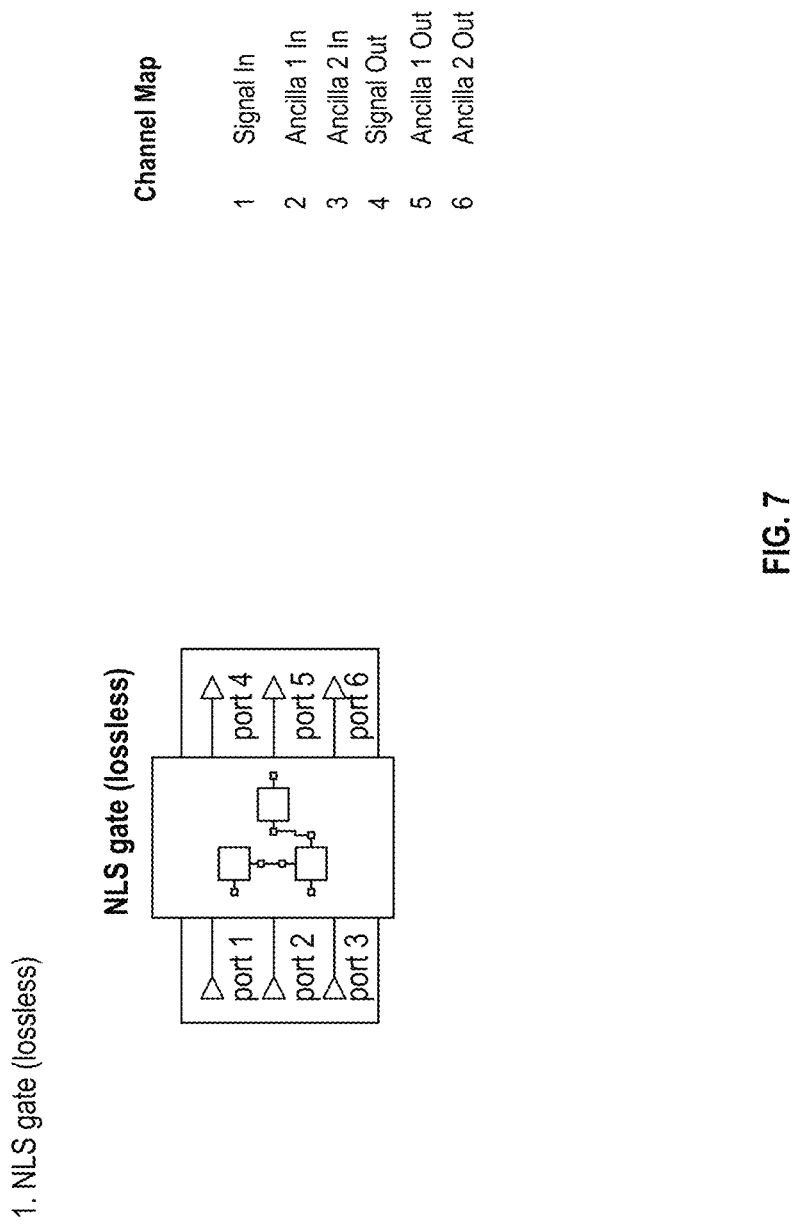
FIG. 7 is a schematic symbol for a nonlinear sign (NLS) (lossless) gate.

FIG. 7 illustrates the three input and three output ports of the NLS gate (lossless), and what each port corresponds to, namely Port 1=Signal In, Port 2=Ancilla 1 In, Port 3=Ancilla 2 In, Port 4=Signal Out, Port 5=Ancilla 1 Out, and Port 6=Ancilla 2 Out.

Figure 8:
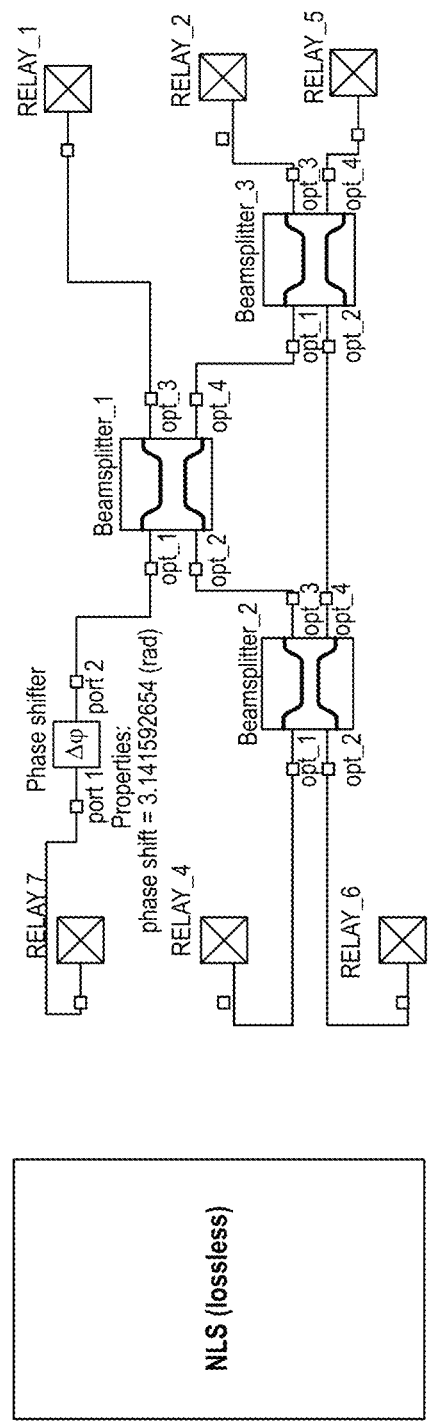
FIG. 8 is a schematic diagram of the circuit of one possible physical implementation of an NLS (lossless) gate element.
Figure 9:
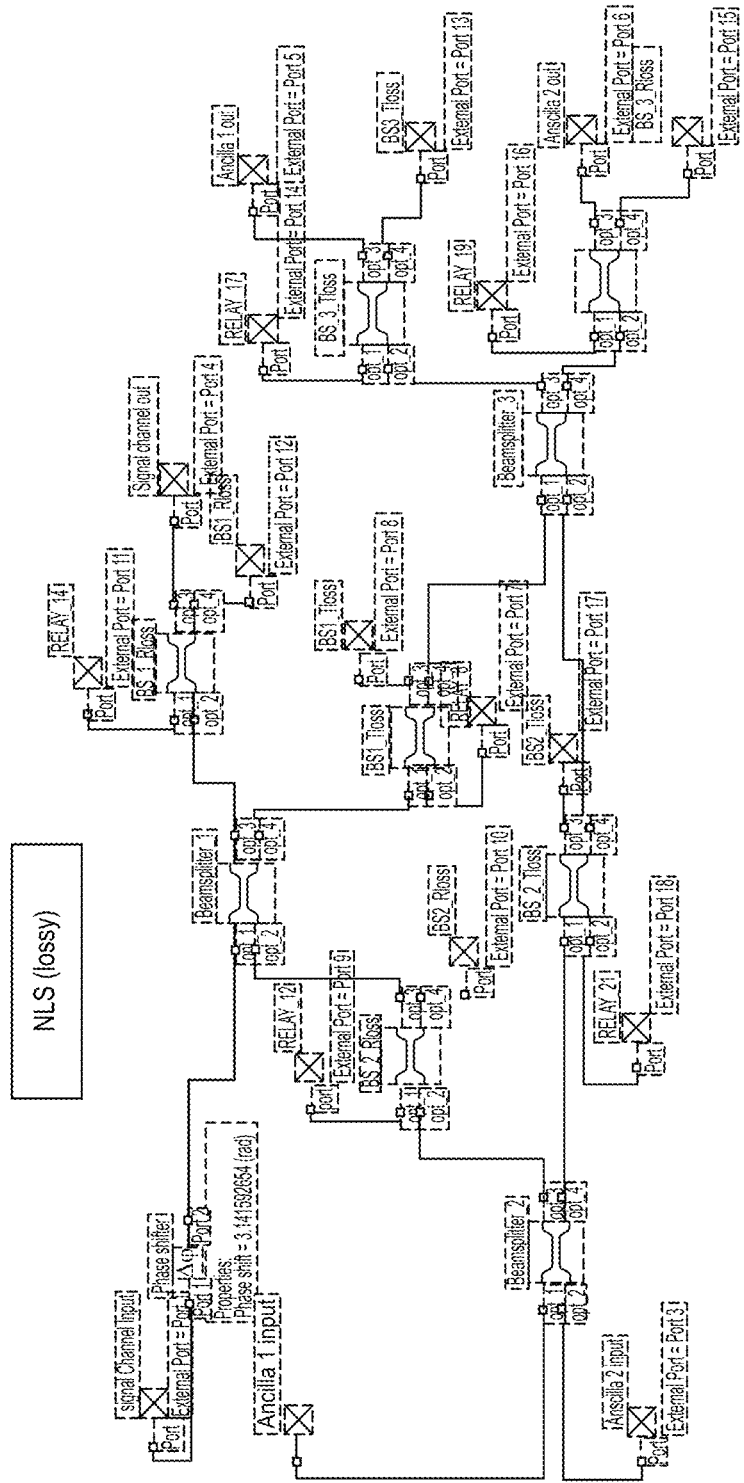
FIG. 9 is a schematic diagram of the circuit of one possible physical implementation of an NLS (lossy) gate with additional elements to handle photonic losses.

FIGS. 8 and 9 show the internal sub-circuits of the lossless and lossy NLS gates. It can be seen that these elements are composed of directional couplers and phase shifters.

Figure 10:
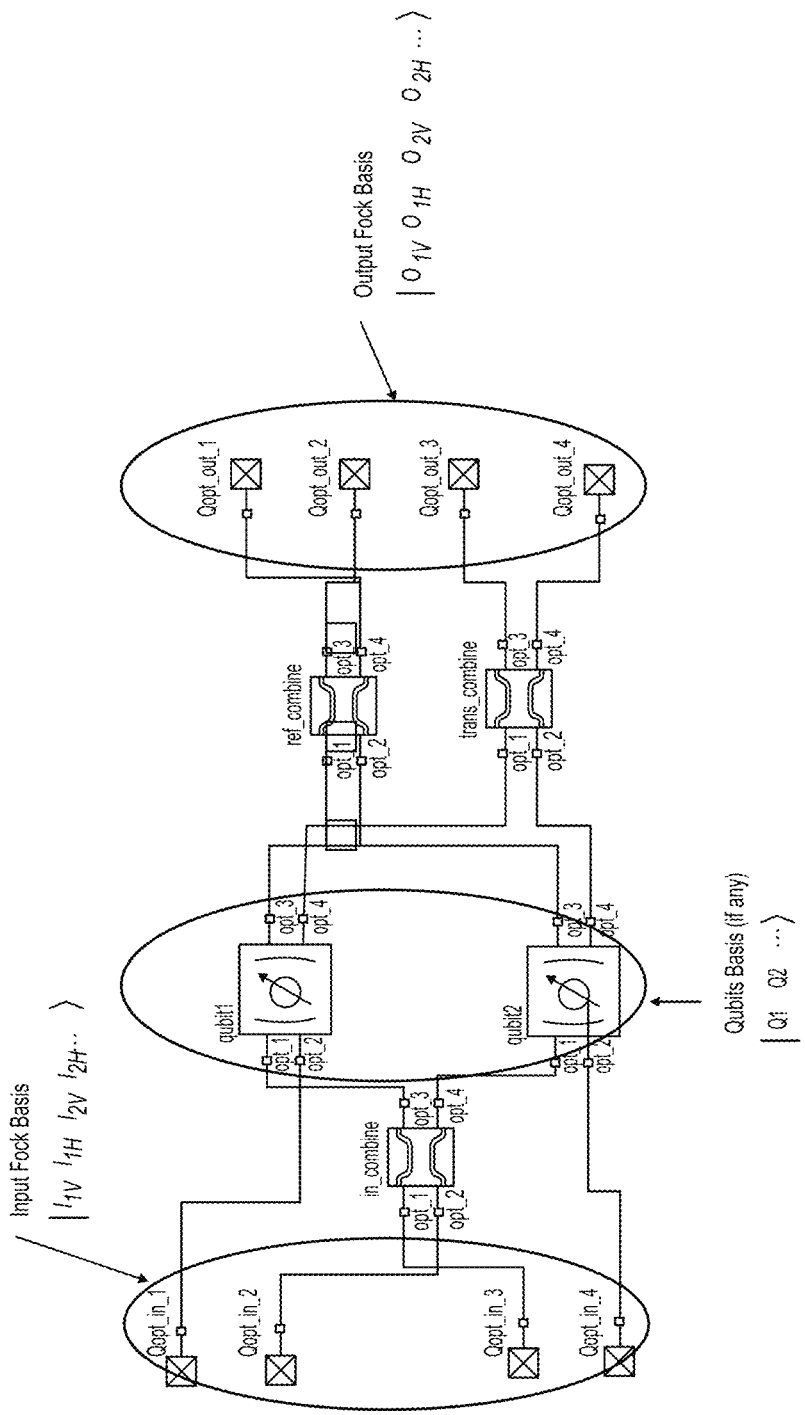
FIG. 10 is a schematic diagram of a quantum circuit that includes photonic states coupled to physical qubit states (such as electronic spin states).

FIG. 10 shows an example of the internal sub-circuits of a quantum element that contains two physical qubits. The elements that contain the qubits will affect the transmission characteristics of the photons, depending on the state of the qubits. This is a circuit similar to one discussed in: "Generating entanglement between quantum dots with different resonant frequencies based on dipole-induced transparency", Sridharan, D., and Waks, E., Phys Rev A 78 052321 (2008).

Figure 11:
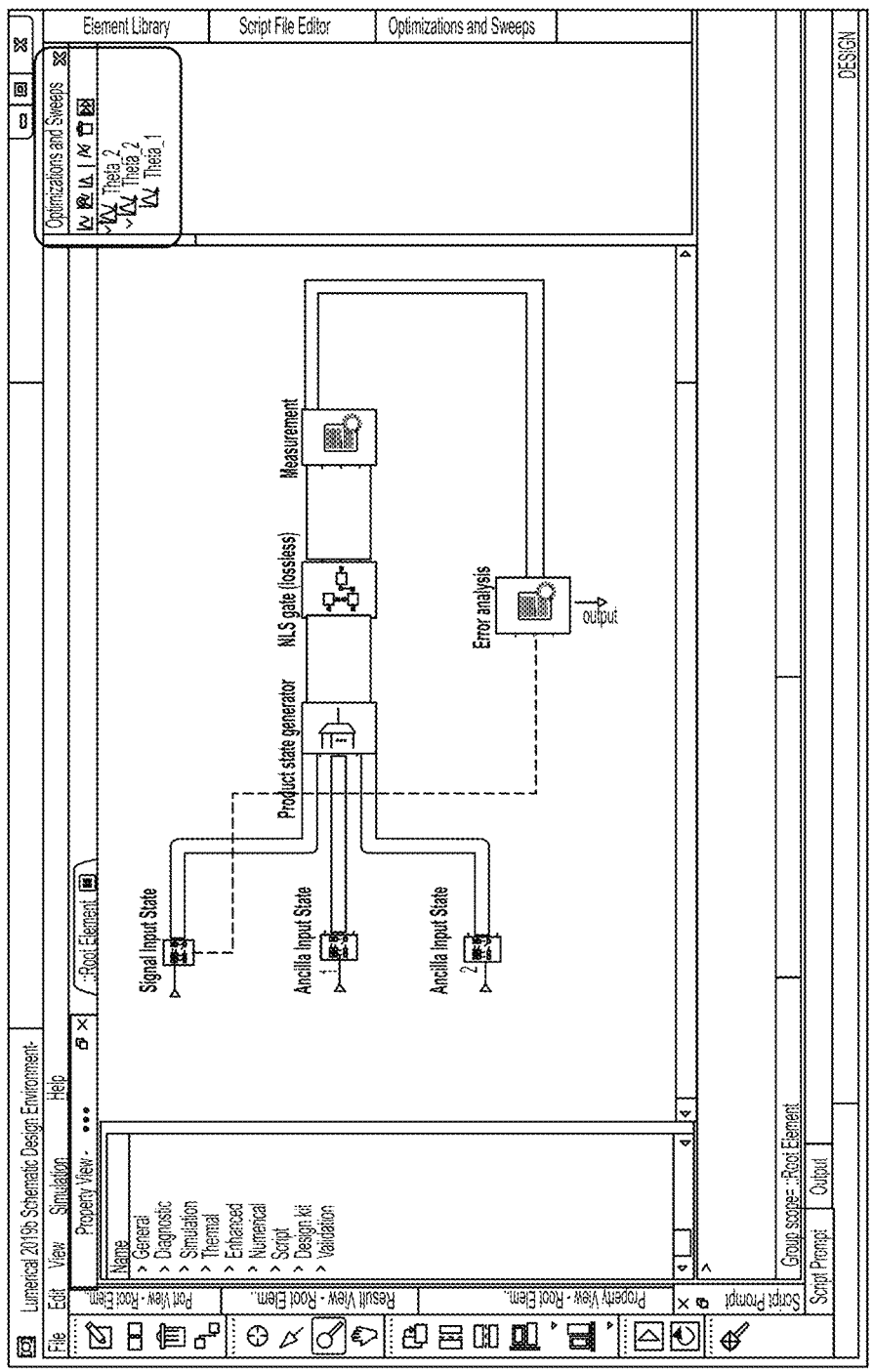
FIG. 11 illustrates setting up a parameter sweep in the user interface.

FIG. 11 illustrates the entire simulation setup within the system for the NLS gate (lossless) example. Three quantum sources are shown (the signal and two ancilla states) connected to a Product State Generator element. The Product State Generator takes separate photonic quantum bus inputs on ports 1, 2, and 3, and combines them into a single photonic quantum bus (as a product state)—see FIG. 4. Once combined, the quantum bus (made up of 3 physical ports on which a large number of quantum states can be carried) is connected to the NLS input (ports 1, 2, and 3). The signal input state has a 0, 1 and 2 photon state with complex coefficients which could be pre-saved as the output of a previous simulation or created with the type of user interface shown in FIG. 5. The ancilla states can also be created easily with the user interface of FIGS. 5A and 5B, or even saved as convenient, pre-defined states.

The output of the NLS gate is connected to an NLS measurement element. This element will output the relative quantum mechanically allowed probabilities for all possible measurement outcomes, along with the corresponding projected density matrix (typically entangled, and typically, but not necessarily of lower dimension than the pre-measurement density matrix).

The output of the NLS measurement element is sent to the NLS error analysis element. In this example, the error analysis consists of calculating the fidelity which is the norm of the projection of the actual output state onto the ideal output state for this gate, for a given measurement outcome. It may be noted that the error analysis considers all possible outcomes of physical measurements consistent with the defined detectors, beam-dumps etc., without actually implementing any particular real "measurement"—it does not perturb the output state in any way. Because it does not perturb the output state, the output state for any designated actual measurement outcome can be connected to subsequent elements or saved as a source for future simulation. In this example, one can calculate the fidelity to determine the quality of the NLS gate, but other error calculations can be used.

Figure 13:
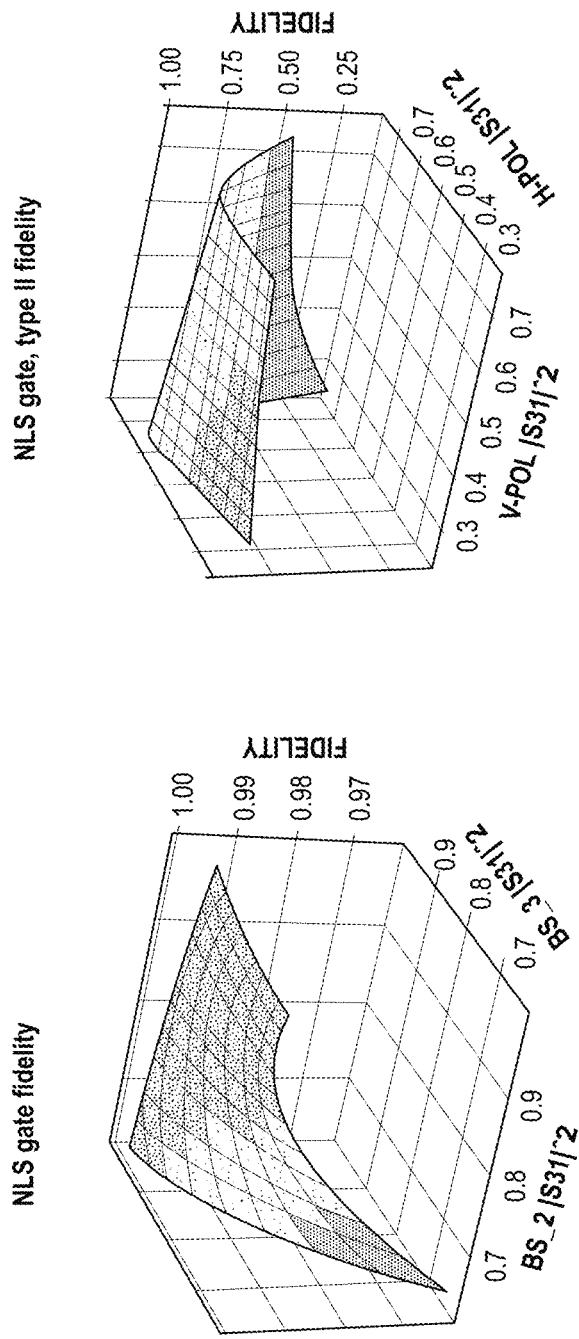
FIG. 13 illustrates example simulation results of fidelity vs beam splitter parameters for both types of lossless NLS gates.

FIG. 11 also shows how a user can use the simulation software to setup a parameter sweep to look at variations in performance of the underlying photonic components, in this particular case the beam splitters which have parameters theta such that the power on one of the output arms is proportional to $|cos(theta)|^2$. After running this parameter sweep, the user would display the fidelity results as shown in FIG. 13. These results allow the user to determine the maximum variation in photonic component performance that can be tolerated while hitting a target fidelity (or other error metric) for the NLS gate. After this analysis, the end user could change the design to make the fidelity more robust against imperfections. Alternatively, the user could use the output of the NLS gate as input to subsequent quantum elements to account for the effect of cascading errors or save the output state which could be used as a source in future quantum simulations. It also makes it possible to compare different implementations of the same circuit that may be more or less sensitive to manufacturing imperfections.

Figure 12:
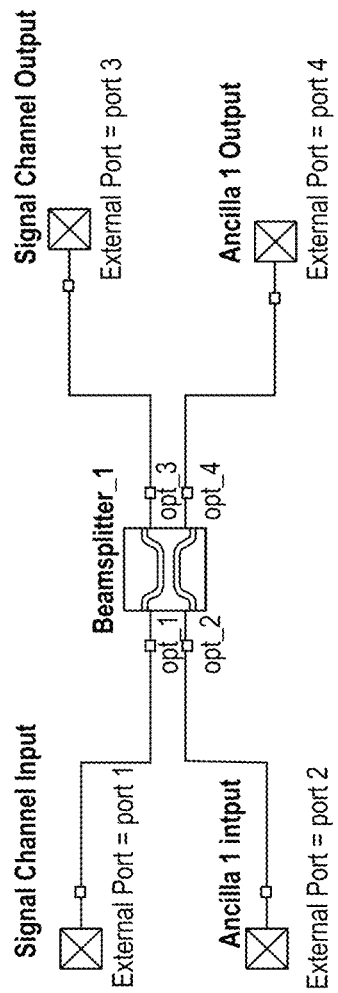
FIG. 12 shows a different possible physical implementation of an NLS gate using waveguides and beam splitters that support two optical modes.

FIG. 12 shows a different possible implementation of an NLS gate (NLS Type II (lossless)) using waveguides that support two orthogonal modes—sometimes referred to as vertically or horizontally polarized although this is an imperfect description of optical waveguide modes generally. This is an alternative implementation of an NLS gate that, in the ideal case, performs the same functionality as the NLS gate shown in FIG. 8 (see Sanaka, et. al., "Experimental Nonlinear Sign Shift for Linear Optics Quantum Computation," PRL. 92(1), 017902, 2004), FIG. 13 shows a comparison of the fidelity of both types of NLS gates discussed in this example: NLS gate (lossless) and NLS Type II (lossless). The fidelity is plotted as a function of certain performance parameters of the beam splitters used in the circuits. It can be seen that there can be clear differences in sensitivity of the fidelity to errors in the beam splitter performance, which underlines the importance of this type of analysis for comparing quantum circuits that perform the same functionality when ideally manufactured.

In this example parameter sweeps are shown, it can be appreciated that this concept can be extended to Monte Carlo analysis to understand the yield: the fraction of manufactured NLS gates that could meet a desired fidelity target.

As explained above, in quantum optics the total number of input (or output) states to the circuit is related to the number of input (or output) channels and the maximum number of photons. Furthermore, these states are not, in general, simply separable product states on the different physical inputs but may be highly correlated across multiple channels (physical waveguides and modes). For this reason, the notion of the photonic quantum bus is introduced. The photonic quantum bus is a collection of physical connections (waveguides) that will carry a (typically large) number of photonic quantum states. A photonic quantum bus may involve only a single channel (waveguide) yet it is still a photonic quantum bus because it can carry multiple quantum states involving 0, 1, 2, . . . n photons.

The product state generator described above is used to combine multiple states on photonic quantum buses into a single quantum bus state under the assumption that the output photonic quantum state can be formed by a simple direct product state of the incoming quantum states. This is the case in the presently described NLS example, since there are no known correlations/entanglements between the quantum states on the 3 physical input channels. However, the NLS gate output cannot in general be represented as simply separable direct product state of states on individual physical channels because the NLS gate creates correlations between the states on all 3 output channels. The product state generator also creates a new combined photonic Hilbert space for the output state, which is defined by the combined waveguides/modes and the overall maximum number of photons, which is not a simple tensor product of all input sub-Hilbert space because the maximum photon number in each channel is increased.

An important aspect of the presently described quantum circuit analysis routine is a fast mechanism for generating the classical S matrix for complex optical circuits, that has dimensions N×N where N is the number of physical input and output channels connecting the circuit to other circuits. The quantum circuit analysis generates an D×D dimensional quantum S matrix that transforms "the quantum input state" into the "quantum output state" of the circuit.

In classical optical circuits, the "classical input state" to the circuit is uniquely defined by a set of N complex numbers that physically represent the complex electric field amplitudes input through the N input ports (each totally independent of the other). This is represented as an N×1 dimensional vector, IN, which when multiplied by the N×N dimensional classical S matrix, generates an N dimensional output vector state OUT=S×IN, where each of the N components of OUT represent the independent complex electric field amplitudes at the N output ports of the circuit.

In quantum optics, the optical input state cannot be represented as N independent complex numbers. There are two levels of additional complexity. First, even if there were just one input and one output channel, the quantum optical field state in individual channels cannot be represented by a complex electric field value. Instead, one needs to specify the optical state in that channel by a set of n+1 complex numbers that represent the relative amplitudes of the 0, 1, 2, . . . n photon components of the quantum optical state in that channel. In a single input/single output circuit, instead of a scalar (1×1) S matrix transforming an input complex field amplitude to an output complex field amplitude, one would need to generate an (n+1)×(n+1) dimensional quantum S matrix (QS), to evaluate the n+1 dimensional quantum output state that would be generated by the circuit (in this particular case D=n+1). In this trivial example, for linear, lossless systems, the QS matrix is simply a higher dimensional identity matrix. Going beyond this trivial example, as discussed below, the QS matrix can be calculated from the S matrix, using formulae from quantum optics/quantum mechanics of photons.

The second level of additional complexity comes from the fact that when one has more than a single input and single output channel; there are multiple distinct ways in which an input state (to the entire circuit) might consist of two (or more, generally n) photons. Take for instance a circuit with two input channels, 1 and 2. There is only one possible input state consisting of zero photons, which might be labelled $|0_1,0_2\rangle$. There are 2 basis states needed to describe an arbitrary input state containing just 1 photon; $|1_1,0_2\rangle$, and $|0_1,1_2\rangle$. So even if one knows that there would never be more than 1 photon incident on the circuit at any given time, one would have to specify 3 complex amplitudes for these three basis states, $|0_1,0_2\rangle$, $|1_1,0_2\rangle$, $|0_1,1_2\rangle$, $|2_1,0_2\rangle$, $|1_1,1_2\rangle$, and $|0_1,1_2\rangle$, to cover all possible input states to the circuit, even though there are only two input channels. If there may be up to 2 photons incident on the circuit, then the number of basis states required to define the input (and separately, the output) states becomes: $|0_1,0_2\rangle$, $|1_1,0_2\rangle$, $|0_1,1_2\rangle$, $|2_1,0_2\rangle$, $|1_1,1_2\rangle$, and $|0_1,2_2\rangle$. Thus, even if the quantum circuit only had to deal with quantum states with a maximum of 2 photons, the two-channel input state would need to be described by a 6-component vector. Clearly the size of the basis needed to describe the input quantum state is nonlinear in both the maximum photon number, and the number of channels.

For example, a 9-channel circuit that would have to deal with at most 3 photons at a time, requires a 220-dimensional basis to describe an arbitrary quantum optical state. Advantageously, the D×D QS matrix needed to map an arbitrary quantum input state to an output state, for n maximum photons in N channels can be calculated from the N×N dimensional S matrix, using formulae from quantum optics/quantum mechanics of photons.

Efficient algorithms can be used to calculate both the classical S matrix for complex, multi-component circuits, and the corresponding QS matrix, but the relevant underlying quantum mechanical equations are well-known. In the present system, there is novelty in the algorithmic implementation that can be applied to an arbitrary classical circuit defined by its S matrix. Given a set of physical input and output channels, the classical S matrix is extracted using existing classical electromagnetic simulation tools. The algorithm for generating the circuit's QS matrix then involves i) augmenting the set of physically-distinct input and output channels with a specification of the maximum number of photons that might occupy any of these channels at any given time, and using this information to delineate a complete basis of quantum optical states that define the corresponding Hilbert space, or photonic quantum bus, through which the quantum information flows through the circuit, ii) applying the quantum mechanical unitary transformation, that involves the S matrix, to each of the input basis states, iii) decomposing the transformed state into its components defined by the output quantum bus basis, and then iv) reading off the column elements of the QS matrix for that particular input state (that defines the corresponding row of QS). The general QS matrix element involves a nonlinear combination of the classical S matrix elements.

After the QS transformation matrix is known for a given circuit, it is equally important to know how a measurement performed on the output state modifies that quantum mechanical output state. Again, it is non-trivial in practice, but theoretically well-known, how to describe a well-executed measurement in terms of a quantum operator, and then apply that quantum operator to the output quantum state of the circuit of interest, to generate the final output state, after measurements are performed. The numerical routines used by the presently described system allow the user to specify the measurement devices to be used at specific locations in the circuit, and then they apply the relevant measurement operators to the quantum output state from the circuit, to produce a final output state (usually of reduced dimensionality) with a probability of the measurement outcome. In this manner, all possible output states for all possible measurement outcomes can be calculated, along with each measurement outcome probability. Further analysis can include selecting output states corresponding to specific measurement outcomes with a user-prescribed measurement mask. This is particularly useful for statistical simulations representing multiple physical measurements repetitively. For example, this would allow a user to feed through only specific states that correspond to desired measurement outcomes. These fed-through channels can then form a new output photonic quantum bus, influenced by the gate circuit and the measurement(s), which could be fed to new circuits as sources. A selection of "standard" measurement types (e.g., single photon measurement, broadband absorption, photon number resolving measurement, etc.) can be available for the user to fill in the measurement mask entries for each output channel, and these can be augmented with associated logical operations. Errors in measurement devices, such as false counts in single photon detectors due to dark current, can be readily accounted for in a statistical analysis.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the system 10, any component of or related to the system 10, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of simulating a physically realistic quantum circuit, the method comprising:
   receiving a classical photonic circuit schematic, a maximum photon number, and a photonic input state for the quantum circuit;
   calculating a quantum S-matrix of the quantum circuit based on the classical photonic circuit schematic and the maximum photon number; and
   generating a quantum output state of the quantum circuit based on the photonic input state and the quantum S-matrix.

2. The method of claim 1, further comprising:
   calculating a set of quantum error parameters; and
   storing the quantum error parameters.

3. The method of claim 2, wherein: a set of quantum or classical measurement devices are coupled to a set of output channels of the quantum circuit.

4. The method of claim 2, further comprising:
   analyzing an error of the generated quantum output state using the set of quantum error parameters.

5. The method of claim 1, wherein the quantum S-matrix is calculated by extracting a classical S-matrix from the classical photonic circuit schematic.

6. The method of claim 1, further comprising:
   receiving specifications of one or more physical quantum objects for the circuit schematic, wherein a classical S-matrix is specified for each possible basis state of each of the one or more physical quantum objects.

7. The method of claim 6, wherein the one or more physical quantum objects comprise one or more qubits.

8. The method of claim 1, wherein the quantum circuit includes photonic states, the method further comprising combining minimally entangled photonic states.

9. The method of claim 1, wherein the photonic input state includes uncorrelated input states and wherein a complete state is created as a direct product of the uncorrelated input states.

10. The method of claim 1, wherein the photonic input state is received as an input ket or density matrix from a predefined set of states.

11. The method of claim 1, further comprising generating a set of possible measurement outcomes, associated probabilities, and projected quantum output states with reduced dimensionality.

12. The method of claim 11, wherein the quantum circuit includes measurement devices and wherein the measurement outcomes are generated based on the measurement devices.

13. The method of claim 1, further comprising providing access to, or outputting, the quantum S-matrix via a user interface.

14. The method of claim 1, further comprising calculating a fidelity of the quantum output state based on a measurement.

15. A non-transitory computer readable medium comprising computer executable instructions which, when executed by one or more processors, cause the processors to perform operations for simulating a physically realistic quantum circuit, the operations comprising:
   receiving a classical photonic circuit schematic, a maximum photon number, and a photonic input state for the quantum circuit;
   calculating a quantum S-matrix of the quantum circuit based on the classical photonic circuit schematic and the maximum photon number; and
   generating a quantum output state of the quantum circuit based on the photonic input state and the quantum S-matrix.

16. The non-transitory computer readable medium of claim 15, further comprising instructions for:
   calculating a set of quantum error parameters; and
   storing the quantum error parameters.

17. The non-transitory computer readable medium of claim 15, wherein the quantum S-matrix is calculated by extracting a classical S-matrix from the classical photonic circuit schematic.

18. A system for simulating a physically realistic quantum circuit, the system comprising one or more processors, memory and a user interface, the memory storing computer executable instructions that, when executed by the processor, cause the system to:
   receive a classical photonic circuit schematic, a maximum photon number, and a photonic input state for the quantum circuit;
   calculate a quantum S-matrix of the quantum circuit based on the classical photonic circuit schematic and the maximum photon number; and
   generate a quantum output state of the quantum circuit based on the photonic input state and the quantum S-matrix.

19. The system of claim 18, further comprising instructions for:
   calculating a set of quantum error parameters; and
   storing the quantum error parameters.

20. The system of claim 18, wherein the quantum S-matrix is calculated by extracting a classical S-matrix from the classical photonic circuit schematic.

* * * * *